United States Patent
Pauly et al.

[19]

[11] Patent Number: 6,054,686
[45] Date of Patent: Apr. 25, 2000

[54] UNIFORM AIR FLOW OVEN

[75] Inventors: Alexis Pauly, Rochefort; Jean-Michel Lequertier, Saint Jean D'Angle; Philippe Braconnier, Echillais, all of France

[73] Assignee: Sogerma, Merignac, France

[21] Appl. No.: 09/119,522

[22] Filed: Jul. 21, 1998

[30] Foreign Application Priority Data

Jul. 21, 1997 [FR] France .................................. 97-09207

[51] Int. Cl.$^7$ ...................................................... A21B 1/00
[52] U.S. Cl. ........................ 219/400; 219/386; 219/385; 219/413; 219/492; 126/21 A; 126/369; 99/447; 99/476; 99/479; 34/191; 34/196; 426/520; 426/526
[58] Field of Search ...................................... 219/400, 386, 219/385, 413, 492; 426/520, 524; 126/21 A, 369; 99/476, 447, 479; 34/191, 196

[56] References Cited

U.S. PATENT DOCUMENTS

| | | | |
|---|---|---|---|
| 3,861,378 | 1/1975 | Rhoads et al. | 126/21 A |
| 3,920,859 | 11/1975 | Foster | 426/520 |
| 4,381,443 | 4/1983 | Guibert | 219/400 |
| 4,384,191 | 5/1983 | Guibert | 219/400 |
| 5,203,315 | 4/1993 | Clawson et al. | |
| 5,533,444 | 7/1996 | Parks | 99/476 |

FOREIGN PATENT DOCUMENTS

| | | |
|---|---|---|
| 2 535 036 | 10/1982 | France . |
| WO89/00381 | 1/1989 | WIPO . |

*Primary Examiner*—John A. Jeffery
*Assistant Examiner*—Leonid Fastovsky
*Attorney, Agent, or Firm*—Fisher, Christen & Sabol

[57] ABSTRACT

An oven for warming food, which includes a carcass (2) delimiting a warming chamber;

a rack (8) provided with two opposed perforated sidewalls (12) and placed inside of the carcass (2) so as to create first and second lateral spaces (13A, 13B);

a blower unit (14) mounted on the back wall (7) of the carcass (2);

unit (15) for guiding the air blown by the blower unit (14).

The unit (15) for guiding the air blown by the blower unit (14) and heated directs the air only toward the first lateral space (13A). The blower unit (14) draws the air from the second lateral space (13B).

7 Claims, 5 Drawing Sheets

UNIFORM AIR FLOW OVEN

BACKGROUND OF THE INVENTION

1. Field of the Invention

The present invention relates to an oven for warming food. Although not exclusively, the oven of the present invention is particularly suitable for defrosting, re-heating and/or cooking pre-cooked meals on board airplanes.

2. Background Art

Ovens of this type, comprising:

- a carcass delimiting a heating chamber and equipped with, in addition to a roof and a floor, a front access door, two opposed sidewalls and a back wall;
- a rack acting as shelving for supports (trays, wire shelves, etc.) on which said food is placed, and provided with two opposed perforated sidewalls, said rack being placed inside said carcass so as to create two opposed lateral spaces (hereafter referred to respectively as the first and second lateral spaces) between said sidewalls of said rack and said sidewalls of said carcass;
- a blower unit with its intake at the center and which blows out peripherally, mounted on said back wall of said carcass;
- means of guiding the air blown by said blower unit for introducing said air laterally between said rack and said carcass; and
- means of heating said air blown by said blower unit are already known, for example, from documents British Published Patent Application No. 2,078,365 and U.S. Pat. No. 4,512,327.

In these known ovens, the air blown by the blower unit and heated by said heating means forms two parallel streams which are blown respectively toward the front in the two lateral spaces, then enter the front of the rack. They are extracted from said rack at the center by said blower unit, traveling back toward the rear. Only a small fraction of the air blown by the unit passes sideways into the rack through the perforations in its sidewalls in order to prevent air pockets.

The result of this is that the longitudinally middle part of said rack receives both hot streams and is therefore heated more than the lateral parts of said rack, which receive just one of the two streams. What is more, other streams of blown hot air enter the rack via its top and its bottom, adding their heating effect to that of the abovementioned streams.

From the foregoing, it will be readily understood that the heating of the food inside said rack cannot be uniform and that, to the contrary, it depends greatly on where said food is placed within the rack.

BRIEF DESCRIPTION OF THE INVENTION

The object of the present invention is to overcome this drawback, and this invention relates to an oven of the type recalled hereinabove, in which the temperature is uniform irrespective of where the food is placed within said rack.

To this end, according to the present invention, the oven of the aforementioned type is noteworthy in that said means of guiding the air blown by said blower unit and heated direct said air only toward said first lateral space and so that said blower unit draws said air only from said second lateral space.

Thus, the blown air forms a single stream circulating in just one direction within said oven. This single stream, blown into said first lateral space by said blower unit, enters said rack through the corresponding sidewall of the rack, the perforations in said wall subdividing said stream into a number of flows which uniformly heat the inside of said rack, then said flows pass through the perforations in the other sidewall of said rack to reconstruct said single stream in said second lateral space, from where it is extracted by said blower unit. Thus a uniform temperature within said oven is obtained.

Advantageously, said means of guiding the air blown by said blower unit comprise a diffuser open toward said first lateral space so as to distribute the blown air uniformly into this space and prevent said blown air from traveling toward said second lateral space.

Furthermore, to make extraction by the blower unit from the second lateral space easier, convergent guide means are provided which conduct the air circulating in said second lateral space toward the central intake of said blower unit.

In addition, in order to avoid the emergence of parasitic streams of hot air in the top and/or bottom of the carcass, it is advantageous for said diffuser and said convergent guide means to extend over the entire height of said lateral spaces.

In an advantageous embodiment of the oven in accordance with the present invention, said diffuser and said convergent guide means form an assembly comprising:

- two plates which are mutually parallel and parallel to the back wall of said carcass;
- an at least approximately V-shaped strip, trapped between said plates and with them delimiting a convergent space which widens toward said second lateral space and communicates with the latter via its wide end;
- an opening made in one of said plates near the vertex of said convergent space and capable of placing the latter in communication with the central intake of said blower unit; and
- a diffusion shroud placed on the side of the plate that has said opening which is not the same side as said convergent space, said shroud being open in the opposite direction to said convergent space, toward said first lateral space.

Advantageously, said carcass has longitudinal strips inside the sidewalls of said carcass.

Moreover, longitudinal bosses are provided in the sidewalls of said carcass so as to guide and uniformly distribute the air in said lateral spaces.

As a preference, two vertical lips, each one secured to a sidewall of said rack and approximately at right angles with respect thereto, are provided at the end of the rack.

It is also advantageous for two lips, secured respectively to said plates and forming an angle between them, to prevent any air from circulating between said first and second lateral spaces at the back of said rack.

BRIEF DESCRIPTION OF THE DRAWINGS

The figures of the appended drawing will make it easy to understand how the invention may be achieved. In these figures, identical references denote similar elements.

DETAILED DESCRIPTION OF THE INVENTION AND THE DRAWINGS

Figure 1:
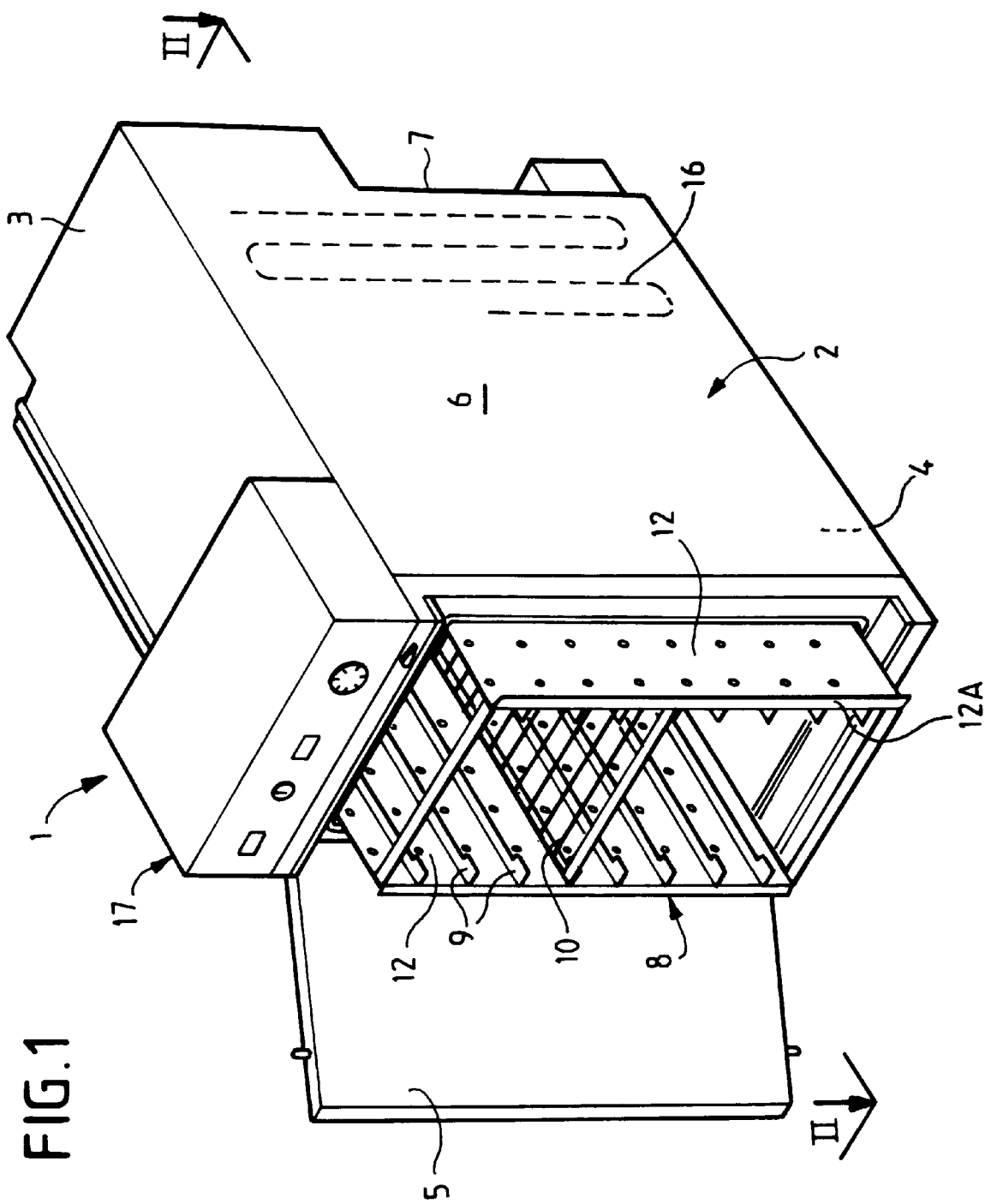
FIG. 1 is a view in perspective of one embodiment of an oven according to the invention.
Figure 2:
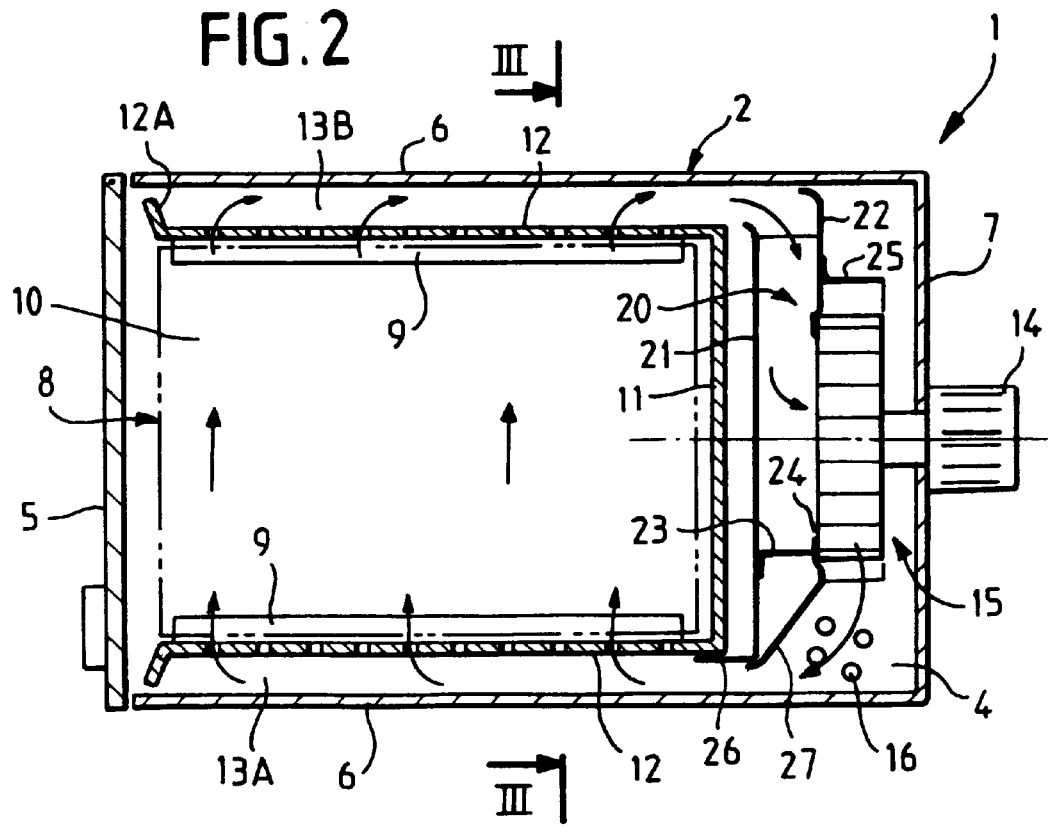
FIG. 2 is a view from above, on sectioning plane II—II of FIG. 1, of the oven according to the invention.

With respect to FIGS. 1 and 2 in particular, the oven 1 for warming food comprises:

- a carcass 2 delimiting a heating chamber and equipped with, in addition to a roof 3 and a floor 4, a front access door 5, two opposed sidewalls 6 and a back wall 7;
- a rack 8 acting as shelving 9 for supports 10 (trays, wire shelves, etc.) on which said food is placed, and equipped with just a back wall 11 and two opposed perforated sidewalls 12, the rack 8 being placed inside the carcass 2 in such a way as to create first and second opposed lateral spaces 13A, 13B between the sidewalls 12 of the rack 8 and the sidewalls 6 of the carcass 2;
- a blower unit (or fan) 14 with its intake at the center and which blows out peripherally, mounted centrally on the back wall 7 of the carcass;
- means 15 of guiding the air blown by the blower unit 14 to introduce this air laterally between racks 8 and the carcass 2; and
- means (depicted symbolically via resistant element 16 in FIG. 1) of heating the air blown by the blower unit, and a control panel conventional for an oven 17.

More specifically, according to the invention, the means 15 of guiding the air blown by the blower unit 14 directs said air only toward said first lateral space 13A, and the blower unit 14 draws said air from said second lateral space 13B, the air following the path indicated by the arrows in FIG. 2.

Figure 3:
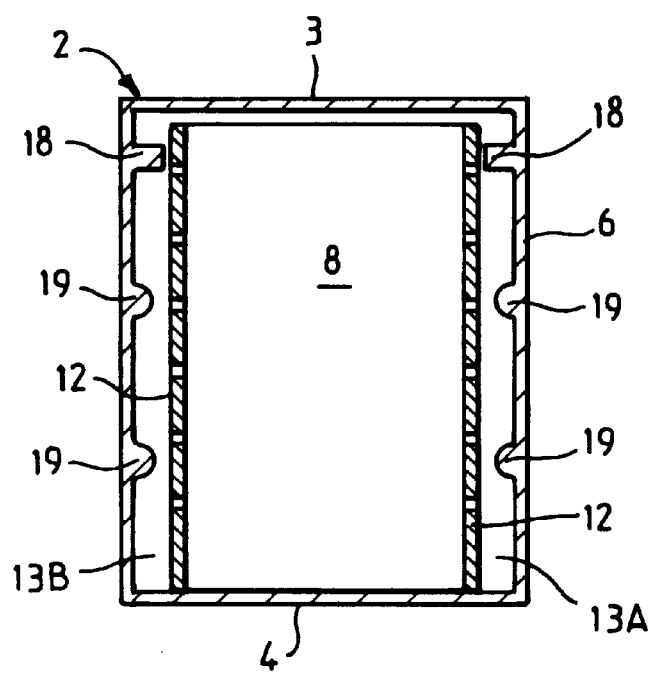
FIG. 3 is a cross section on the line III—III of FIG. 2, of the oven of FIG. 1.
Figure 4:
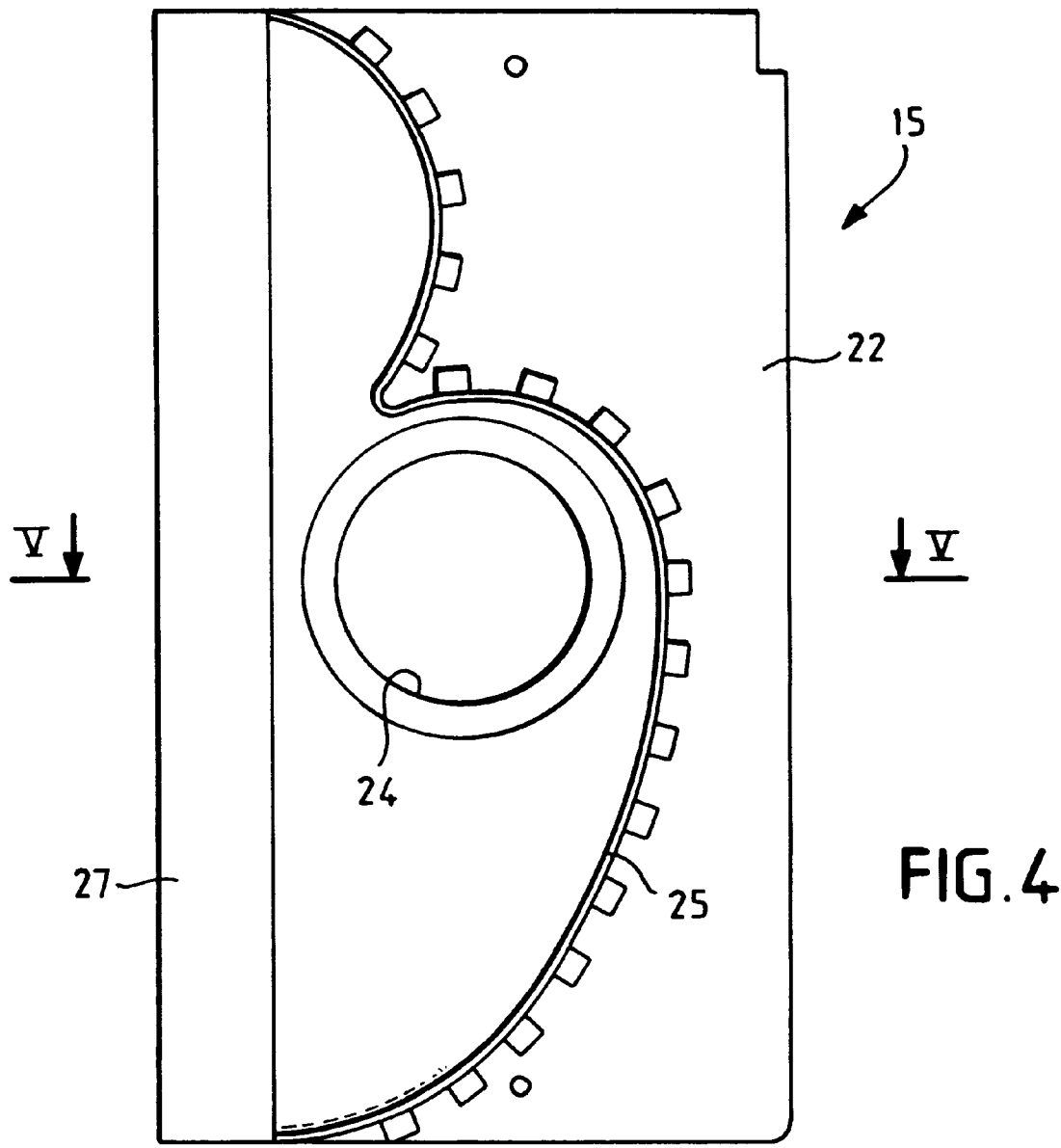
FIG. 4 is an elevation of the diffuser.
Figure 5:
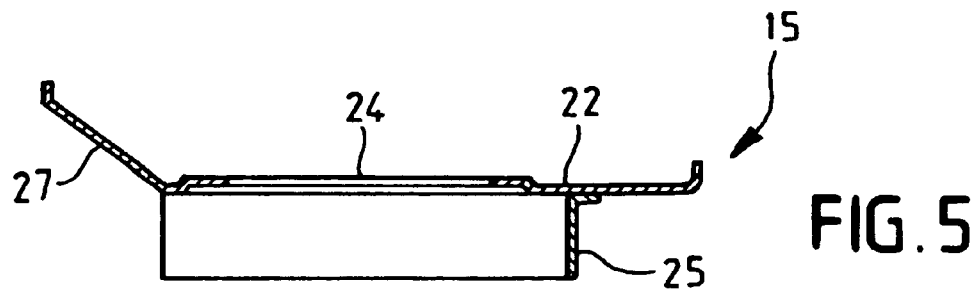
FIG. 5 is a section on V—V of FIG. 4.
Figure 6:
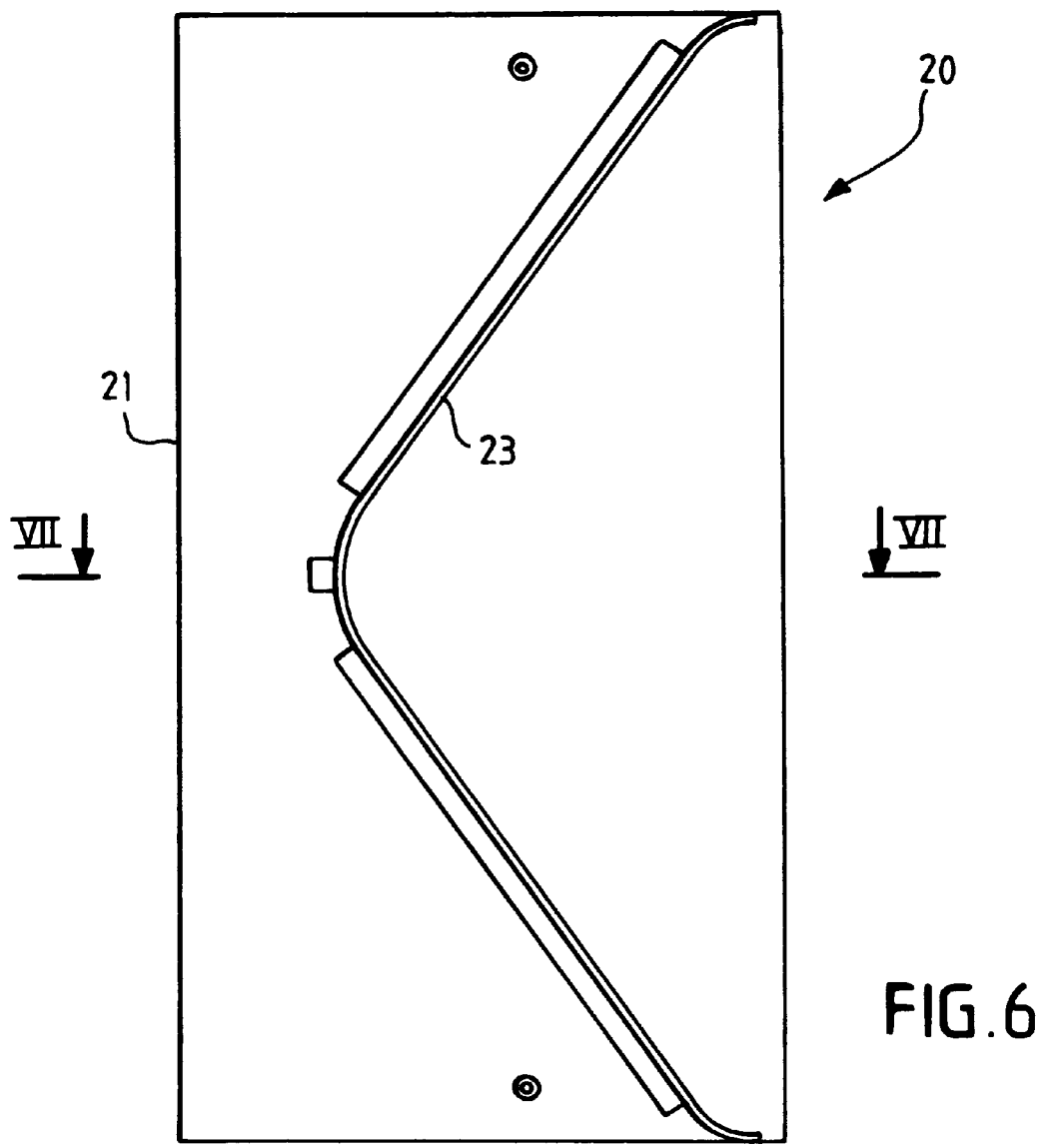
FIG. 6 is a elevation of the convergent guide means.
Figure 7:
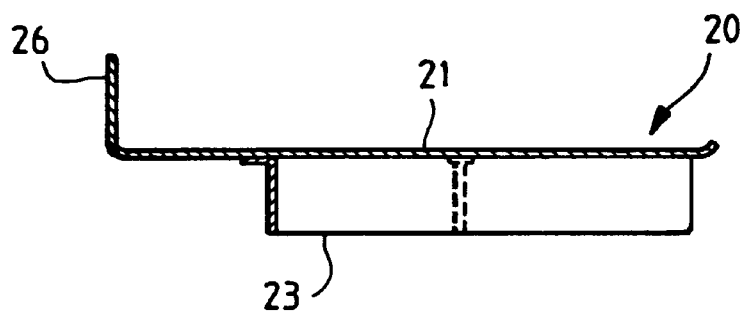
FIG. 7 is a section on VII—VII of FIG. 6.
Figure 8:
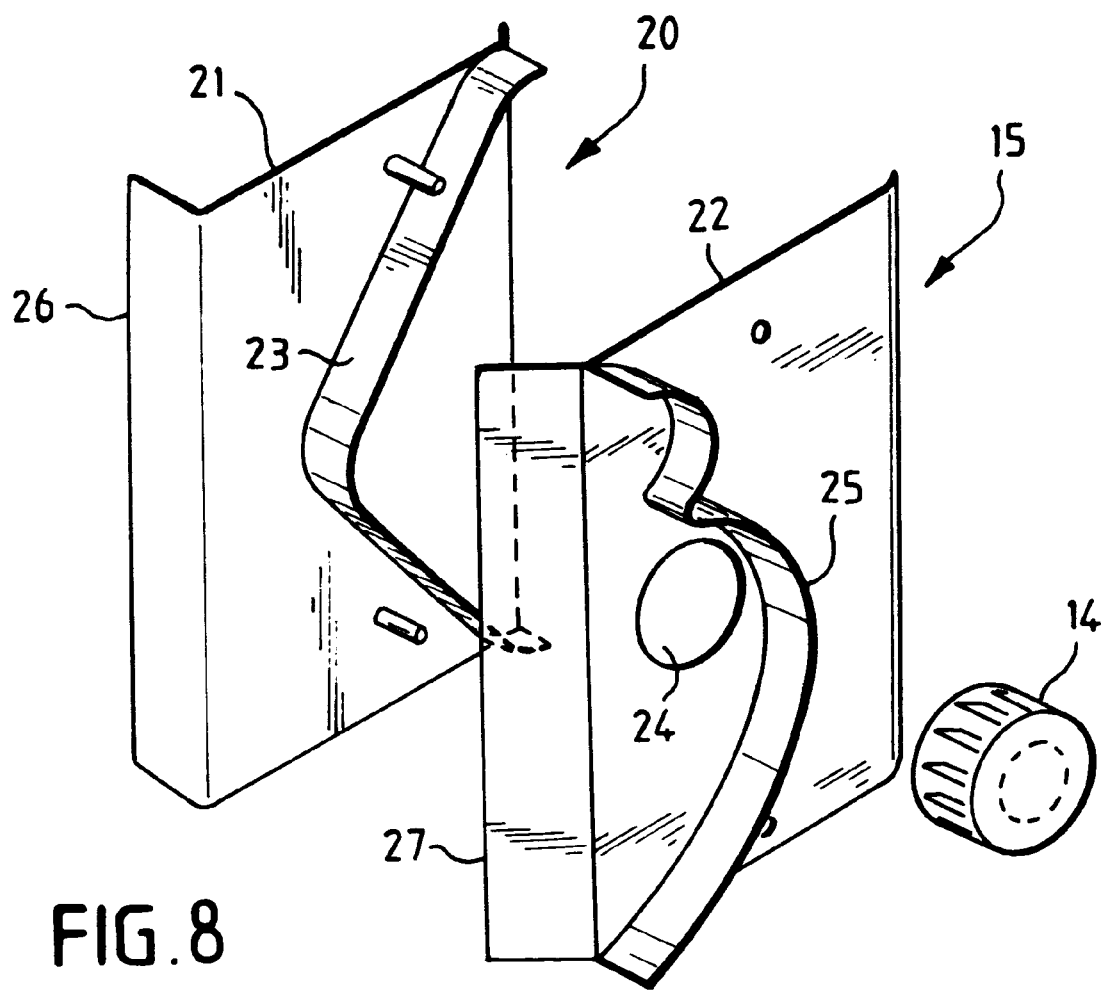
FIG. 8 is an exploded perspective view of the diffuser—convergent guide means—blower unit.

Furthermore, with respect to FIG. 3, it can be seen that the carcass 2 advantageously has longitudinal strips 18 inside the sidewalls 6 of the carcass 2 and which:

- center the rack 8 in the carcass 2 in order to respect the passage cross sections for air in the two lateral spaces 13A, 13B,
- prevent air from leaking between the inside of the rack 8 and the two lateral spaces 13A, 13B along the top of the rack (note that neither is it possible for air to leak from the bottom of the rack because the latter rests directly on the floor 4 of the carcass 2).

In addition, longitudinal bosses 19 in the sidewalls 6 of the carcass 2 divide the air through the lateral spaces 13A, 13B for a uniform distribution between the top and bottom of the carcass.

These measures provide further guarantees that the air cannot circulate from one lateral space to the other except through the rack 8, especially since two vertical lips 12A, each secured to a sidewall 12 and approximately at right angles to this sidewall, are provided at the end of the rack 8, at its front.

Furthermore, with respect to FIGS. 4 to 8, the means of guiding the air blown by the blower unit 14 comprise a diffuser 15, extending over the entire height of the first lateral space 13A and open toward said first lateral space in order to distribute the blown air uniformly therein and prevent said blown air from traveling toward the second lateral space 13B.

The oven 1 also comprises convergent guide means 20 extending over the entire height of the second lateral space 13B and directing the air circulating inside said second lateral space toward the central intake of the blower unit 14.

Explained in greater detail, the diffuser 15 and the convergent guide means 20 form an assembly comprising:

- two plates 21 and 22 which are mutually parallel and parallel to the back wall 7 of the carcass;
- an at least approximately V-shaped strip 23 trapped between the plates 21, 22 and with them delimiting a convergent space which widens in the direction of the second lateral space 13B and communicates with the latter via its wide end;
- an opening 24 made in the plate 22 near the vertex of said convergent space and capable of placing the latter in communication with the central intake of the blower unit 14; and
- a diffusion shroud 25 placed on the side of the plate 22 that has the opening 24, that is the opposite side to said convergent space (and therefore through the strip 23 secured to the plate 21), the shroud 25 being open away from said convergent space (strip 23) in the direction of the first lateral space 13A, and essentially ensuring the uniform distribution of the air from top to bottom of the carcass.

Furthermore, lips 26 and 27 secured, respectively, to the plates 21 and 22 and forming an angle with these plates, prevent any air from circulating between the first and second lateral spaces 13A, 13B at the back of the rack 8.

What is claimed is:

1. An oven for warming food, comprising:
   - a carcass (2) delimiting a heating chamber and equipped with, in addition to a roof (3) and a floor (4), a front access door (5), two opposed sidewalls (6) and a back wall (7);
   - a rack (8) acting as shelving (9) for supports (10) on which said food is placed, and provided with two opposed perforated sidewalls (12), said rack (8) being placed inside said carcass (2) so as to create first and second opposed lateral spaces (13A, 13B) between said sidewalls (12) of said rack (8) and said sidewalls (6) of said carcass (2);
   - a blower unit (14) with its intake at the center and which blows out peripherally, mounted on said back wall (7) of said carcass;
   - means (15) of guiding the air blown by said blower unit (14) for introducing said air laterally between said rack (8) and said carcass (2); and
   - means (16) of heating said air blown by said blower unit (14):
   - wherein said means of guiding the air blown by said blower unit comprise a diffuser (15) open toward said first lateral space (13A) so as to distribute the blown air uniformly into this space and prevent said blown air from traveling toward said second lateral space (13B), said diffuser (15) extending over the entire height of said first lateral space (13A);
   - and which oven comprises convergent guide means (20) that conduct the air circulating in said second lateral space (13B) toward the central intake of said blower unit (14),
   - such that said means (15) of guiding the air blown by said blower unit (14) and heated direct said air only toward said first lateral space (13A) and such that said blower unit (14) draws said air only from said second lateral space (13B).

2. The oven as claimed in claim 1, wherein said convergent guide means (20) extend over the entire height of said second lateral space (13B).

3. The oven as claimed in claim 1, wherein in said diffuser (15) and said convergent guide means (20) form an assembly comprising:

- two plates (21, 22) which are mutually parallel and parallel to the back wall (7) of said carcass (2);
- an at least approximately V-shaped strip, trapped between said plates (21, 22) and with them delimiting a convergent space which widens toward said second lateral space (13B) and communicates with the latter via its wide end;
- an opening (24) made in one (22) of said plates near the vertex of said convergent space and capable of placing the latter in communication with the central intake of said blower unit (14); and
- a diffusion shroud (25) placed on the side of the plate (22) that has said opening (24) which is not the same side as said convergent space, said shroud being open in the opposite direction to said convergent space, toward said first lateral space (13A).

4. The oven as claimed in claim 3, wherein two lips (26, 27), respectively secured to said plates (21, 22) and making an angle between them, prevent any air from circulating between said first (13A) and second (13B) lateral spaces at the back of said rack (8).

5. The oven as claimed in claim 1, wherein said carcass (2) has longitudinal strips (18) inside the sidewalls of said carcass.

6. The oven as claimed in claim 1, wherein longitudinal bosses (19) are provided in the sidewalls (6) of said carcass (2) so as to guide and uniformly distribute the air in said lateral spaces (13A, 13B).

7. The oven as claimed in claim 1, wherein two vertical lips (12A), each one secured to a sidewall (12) of said rack (8) and approximately at right angles with respect thereto, are provided at the end of the rack, preventing any air from circulating between said first (13A) and second (13B) lateral spaces at the front of said rack (8).

* * * * *